US012755121B2

(12) United States Patent
Rho et al.

(10) Patent No.: US 12,755,121 B2
(45) Date of Patent: Oct. 6, 2026

(54) OBJECT INCLUDING META-LABEL AND METHOD OF MANUFACTURING THE META-LABEL

(71) Applicant: POSTECH RESEARCH AND BUSINESS DEVELOPMENT FOUNDATION, Pohang-si (KR)

(72) Inventors: Junsuk Rho, Pohang-si (KR); Joohoon Kim, Pohang-si (KR); Hyun Jung Kang, Pohang-si (KR); Hongyoon Kim, Pohang-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 20 days.

(21) Appl. No.: 18/968,286

(22) Filed: Dec. 4, 2024

(65) Prior Publication Data

US 2025/0265436 A1 Aug. 21, 2025

(30) Foreign Application Priority Data

Feb. 15, 2024 (KR) ........................ 10-2024-0022133
Aug. 6, 2024 (KR) ........................ 10-2024-0104732

(51) Int. Cl.

*G06K 19/06* (2006.01)
*B82Y 10/00* (2011.01)
*B82Y 30/00* (2011.01)

(52) U.S. Cl.

CPC ........ *G06K 19/06084* (2013.01); *B82Y 10/00* (2013.01); *B82Y 30/00* (2013.01)

(58) Field of Classification Search

CPC ........ G03F 7/00; G03F 7/0002; G03F 7/0005; G06K 19/06084

See application file for complete search history.

(56) References Cited

U.S. PATENT DOCUMENTS 6,951,687 B2 10/2005 Nightingale et al.
7,833,438 B2 * 11/2010 Lucht ...................... C08L 65/00 436/172
2019/0231267 A1 * 8/2019 Oren ....................... B32B 9/041
2020/0073234 A1 3/2020 Watkins et al.
2024/0109104 A1 * 4/2024 Friemann Dmitriev ..................... B07C 5/342

(Continued)

FOREIGN PATENT DOCUMENTS

CN 102016960 A 4/2011
CN 116013145 A 4/2023
JP 2006-513463 A 4/2006

(Continued)

OTHER PUBLICATIONS

Communication dated Apr. 11, 2025 issued by the European Patent Office in application No. 24214482.2.

(Continued)

*Primary Examiner* — Thien M Le
*Assistant Examiner* — April A Taylor
(74) *Attorney, Agent, or Firm* — Sughrue Mion, PLLC

(57) ABSTRACT

A meta-label includes an object and a plurality of nanostructures formed on one surface of the object and including a material including a water-soluble polymer and dielectric nanoparticles, wherein the plurality of nanostructures are arranged to display characters or patterns, and the characters or patterns include information about the object.

13 Claims, 20 Drawing Sheets

(56) References Cited

U.S. PATENT DOCUMENTS

| | | | | |
|---|---|---|---|---|
| 2024/0124726 | A1 * | 4/2024 | Mallavarapu | C09D 11/037 |
| 2024/0203293 | A1 | 6/2024 | Ishimaru et al. | |

FOREIGN PATENT DOCUMENTS

| | | | | | |
|---|---|---|---|---|---|
| JP | 5505278 | B2 | 5/2014 | | |
| KR | 10-2018-0065786 | A | 6/2018 | | |
| KR | 10-2245410 | B1 | 4/2021 | | |
| KR | 10-2252351 | B1 | 5/2021 | | |
| KR | 10-2023-0114556 | A | 8/2023 | | |
| KR | 10-2023-0170682 | A | 12/2023 | | |
| WO | WO-2009029964 | A2 * | 3/2009 | | G01N 33/52 |

OTHER PUBLICATIONS

Schift, et al., "Nanoimprint Lithography-Patterning of Resists Using Molding", Springer Handbook of Nanotechnology, Jan. 1, 2010, XP002753672, pp. 271-312 (42 pages total).

Gates, et al., "New Approaches to Nanofabrication: Molding, Printing, and Other Techniques", Chem. Rev., 2005, vol. 105, No. 4, XP002414950, pp. 1171-1196 (26 pages total).

Joohoon Kim et al., "A water-soluble label for food products prevents packaging waste and counterfeiting", Nature Food, Apr. 2024, pp. 293-300, vol. 5.

Gwanho Yoon et al., "Single-step manufacturing of hierarchical dielectric metalens in the visible", Nature Communications, 2022, pp. 1-10, 11:2268.

Andre Espinha et al., "Hydroxypropyl cellulose photonic architectures by soft nanoimprinting lithography", Nature Photonics, Jun. 2018, pp. 343-348, vol. 12.

Dong Kyo Oh et al., "Nanoimprint lithography for high-throughput fabrication of metasurfaces", Front. Optoelectron., 2021, vol. 14, No. 2, pp. 229-251 (23 pages total).

Office Action issued Apr. 8, 2025 in Korean Patent Application No. 10-2024-0104732.

* cited by examiner

103

OBJECT INCLUDING META-LABEL AND METHOD OF MANUFACTURING THE META-LABEL

CROSS-REFERENCE TO RELATED APPLICATION

This application is based on and claims priority under 35 U.S.C. § 119 to Korean Patent Application No. 10-2024-0022133, filed on Feb. 15, 2024, and 10-2024-0104732, filed on Aug. 6, 2024, in the Korean Intellectual Property Office, the disclosures of which are incorporated by reference herein in their entireties.

BACKGROUND

1. Field

The disclosure relates to a meta-label and a method of manufacturing the meta-label.

This invention was supported by Samsung Research Funding & Incubation Center of Samsung Electronics under Project Number SRFC-IT1901-52.

2. Description of the Related Art

Labeling technology that displays information on objects such as food or food containers has various issues such as information display, origin security, anti-counterfeiting/alteration, and environmental pollution.

For example, a labeling method that creates color by depositing a metal is not suitable for application to food. This is because an e-beam deposition machine used in the process of depositing a metal is conducted in a vacuum environment, so there are many restrictions on the substrate on which it is deposited. In addition, because the time for forming a vacuum environment is long, it is expensive, and discarded labels containing metal materials cause environmental pollution. Furthermore, because a metal has a high absorption coefficient, it is difficult to form a clear color in a visible light range.

SUMMARY

Provided are a meta-label and a method of manufacturing the meta-label.

Additional aspects will be set forth in part in the description which follows and, in part, will be apparent from the description, or may be learned by practice of the presented embodiments of the disclosure.

According to an aspect of the disclosure, a meta-label includes an object and a plurality of nanostructures formed on one surface of the object and including a material including water-soluble polymers and dielectric nanoparticles, wherein the plurality of nanostructures are arranged to display characters or patterns, and the characters or patterns include information about the object.

The object may include food or a container for holding food.

The water-soluble polymer may include hydroxypropyl cellulose.

The dielectric nanoparticles may include metal oxides.

The dielectric nanoparticles may include $TiO_2$ nanoparticles.

The nanostructure may include hydroxypropyl cellulose and $TiO_2$ nanoparticles mixed therewith.

A ratio of $TiO_2$ nanoparticles included in the hydroxypropyl cellulose may be about 50 wt % to about 70 wt %.

An extinction coefficient of the nanostructure may be less than $01\times10^{-5}$ and the refractive index is greater than 1.8.

The plurality of nanostructures may be regularly arranged with a predetermined arrangement period, and the predetermined arrangement period may be determined so that a Rayleigh anomaly is formed within the visible light wavelength band.

The plurality of nanostructures may be regularly arranged with a predetermined arrangement period, wherein the predetermined arrangement period is P, and the refractive index of the target is n, P×n may be about 400 nm to about 700 nm.

The pattern may be a QR code.

According to an aspect of the disclosure, a method of manufacturing a meta-label, the method includes manufacturing a master mold having a pattern identical to a plurality of nanostructure array patterns to be formed on a target object, manufacturing a soft mold by replicating the master mold, applying nano-ink including water-soluble polymers and dielectric nano particles onto the soft mold, and attaching the soft mold to which the nano-ink is applied to the target object, and separating the soft mold from the target object.

The water-soluble polymer may include hydroxypropyl cellulose.

The dielectric nanoparticles may include metal oxides.

The dielectric nanoparticles may include $TiO_2$ nanoparticles.

The nano-ink may include hydroxypropyl cellulose and $TiO_2$ nanoparticles mixed therewith.

A ratio of $TiO_2$ nanoparticles included in the hydroxypropyl cellulose may be about 50 wt % to about 70 wt %.

An extinction coefficient of the nano-ink may be less than $1\times10^{-5}$ and the refractive index may be greater than 1.8.

The object may include food or a container for holding food.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
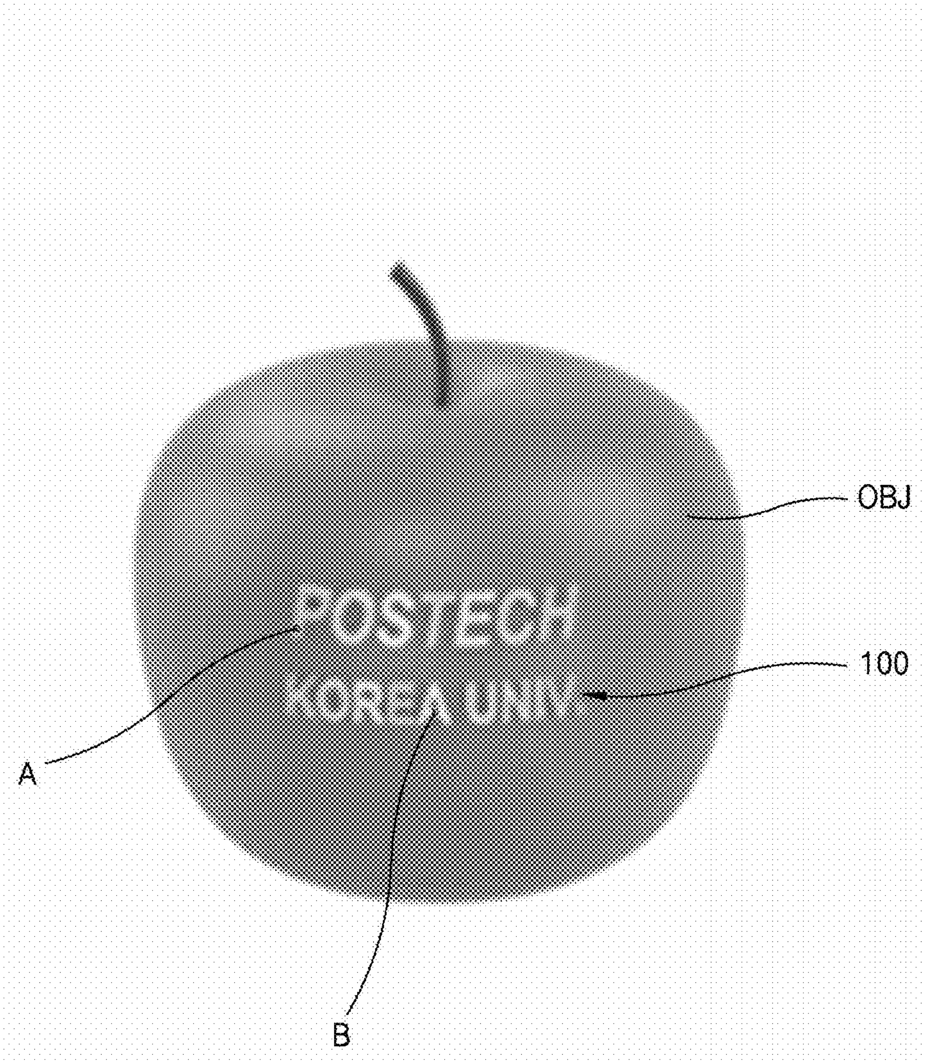
FIG. 1 schematic diagram showing a meta-label according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The embodiments of the disclosure are capable of various modifications and may be embodied in many different forms. In the drawings below, like reference numerals refer to like components, and the size of each component in the drawings may be exaggerated for clarity and convenience of explanation.

When an element or layer is referred to as being "on" or "above" another element or layer, the element or layer may be directly on another element or layer or intervening elements or layers.

Although the terms "first", "second", etc. may be used herein to describe various elements, these elements should not be limited by these terms. These terms are only used to distinguish one element from another. These terms do not limit the difference in the material or structure of the components.

The singular forms include the plural forms unless the context clearly indicates otherwise. When a part "comprises" or "includes" an element in the specification, unless otherwise defined, other elements are not excluded from the part and the part may further include other elements Also, in the specification, the term "units" or " . . . modules" denote units or modules that process at least one function or operation, and may be realized by hardware, software, or a combination of hardware and software.

The term "above" and similar directional terms may be applied to both singular and plural.

Operations that constitute a method, the operations may be performed in any appropriate sequence unless the sequence of operations is clearly described or unless the context clearly indicates otherwise. Also, all examples or example terms (for example, etc.) are simply used to explain in detail the technical scope of the inventive concept, and thus, the scope of the inventive concept is not limited by the examples or the example terms as long as it is not defined by the claims.

Figure 2A:
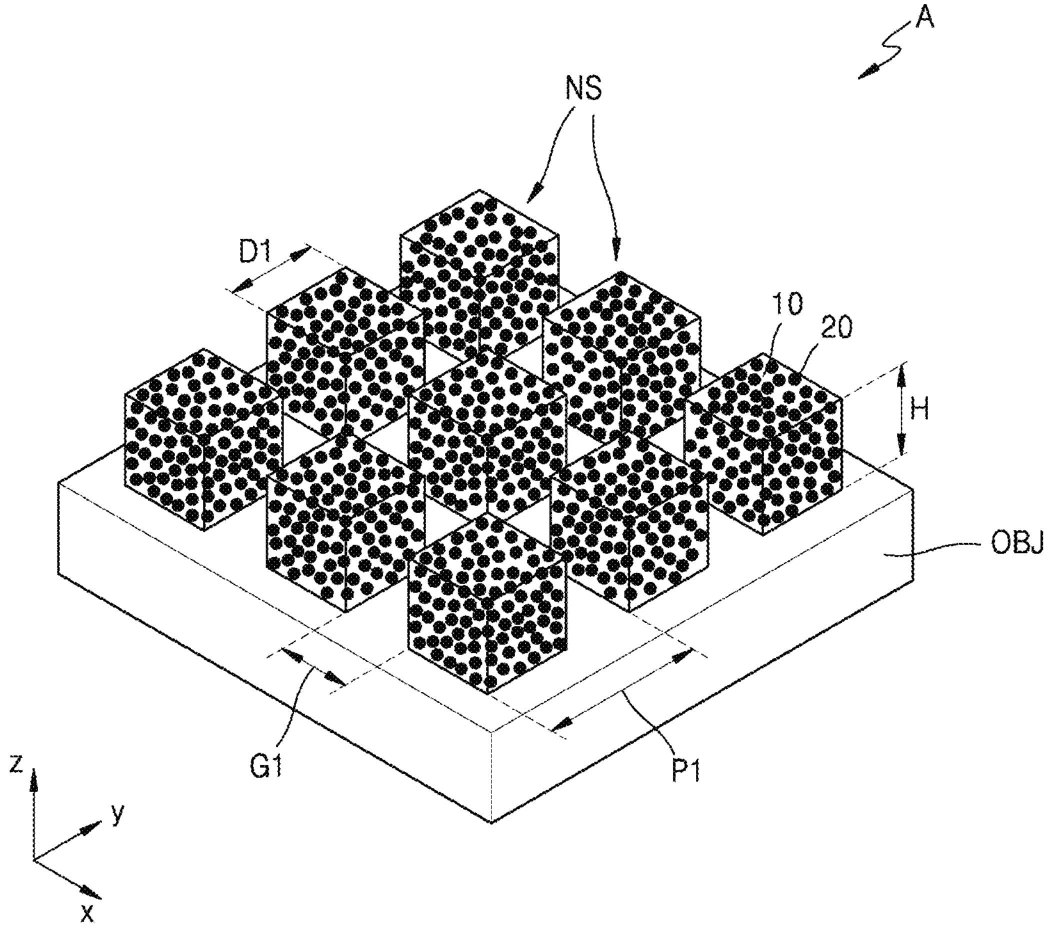
FIG. 2A and FIG. 2B are perspective views showing in detail two different parts of FIG. 1.
Figure 2B:
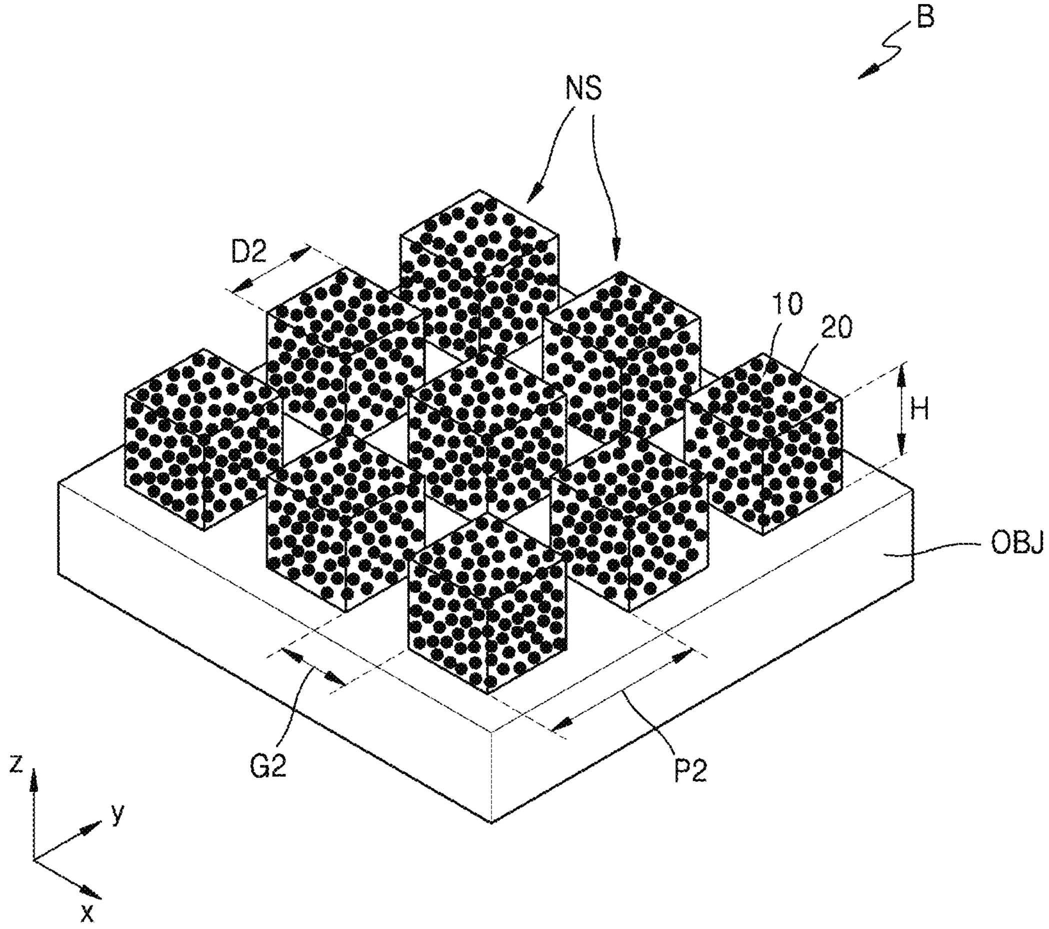

FIG. 1 schematic diagram showing a meta-label 100 according to an embodiment, and FIG. 2A and FIG. 2B are perspective views showing two different parts in detail of FIG. 1.

The meta-label 100 includes an object OBJ and a plurality of nanostructures NS arranged on one side of the object OBJ. The plurality of nanostructures NS are arranged to display letters or patterns, and these letters or patterns may include information about the object OBJ. The letters shown in FIG. 1 are examples, and the meta-label 100 may include patterns such as shapes or patterns such as QR codes.

The meta-label 100 may express various information about the object OBJ, such as country of origin, manufacturing date, sugar content, nutritional information, expiration date, etc. The object OBJ may be food or a food container, and if the object OBJ is a food container, information about the object OBJ means information about the food included in the container.

The plurality of nanostructures NS having a shape dimension less than a wavelength of incident light may exhibit various colors depending on their arrangement form. By adjusting a height of the nanostructures NS, an arrangement period, and a spacing between the nanostructures NS, a reflection wavelength band may be changed, and accordingly, a pattern formed by different nanostructures NS exhibits different colors.

An arrangement period in which the nanostructures NS are regularly arranged may be determined so that a Rayleigh anomaly is formed within the visible light wavelength band. When the arrangement period of the nanostructures NS is P and the refractive index of the object OBJ is n, P×n may be about 400 nm to about 700 nm. Depending on a color to be implemented by the arrangement of nanostructures NS, P×n may be set, that is, the arrangement period P may be determined.

A magnetic dipole mode may be expressed by the Mie lattice resonance mode formed in the nanostructure NS by incident light, and a reflection peak may be formed at the frequency of the corresponding mode. In addition, by controlling the Rayleigh anomaly that occurs in a plane diffraction mode due to a periodic arrangement of nanostructures NS, an electric dipole mode and high-order Mie resonance modes occurring below a desired wavelength may be suppressed and only the magnetic dipole mode may be strongly expressed. With this principle, a single reflection peak may be formed by the arrangement of multiple nanostructures NS and a clear structural color may be expressed.

The arrangement of nanostructures NS included in the meta-label 100 may be periodic and may have different arrangement periods by group to display different colors according to position. For example, the nanostructures NS at positions A and B shown in FIG. 1 may have different arrangement periods P1 and P2 as illustrated in FIG. 2A and FIG. 2B, respectively. In FIG. 2A, the nanostructures NS may be arranged with a width of D1, an arrangement of P1, and an spacing of G1. In FIG. 2B, the nanostructures NS may be arranged with a width of D2, an arrangement period of P2, and an spacing of G2. The arrangement rules of such nanostructures NS and the shape of the nanostructures NS may be determined according to colors to be displayed in regions A and B. Heights of the nanostructures NS are indicated as the same as H, but it is not excluded that they may be different heights. In addition, sizes of the nanostructures NS may be the same, and only the arrangement period and spacing may be adjusted differently.

The shapes of the nanostructures NS are all shown in the form of rectangular parallelepipeds, but this is an example, and they may be transformed into other shapes such as polygonal columns, cylinders, and elliptical columns.

For the clarity of color expressed by the arrangement of nanostructures NS, a material having a high refractive index and low absorption rate (extinction coefficient) for light of the corresponding wavelength band is appropriate as the material of the nanostructures NS. However, in general, the refractive index and the absorption rate tend to be proportional, and also, when an environmentally friendly material is to be used, it is not easy to secure a material suitable for the meta-label 100.

The nanostructure NS included in the meta-label 100 according to an embodiment may include a material including a water-soluble polymer 10 and a dielectric nanoparticle 20. The water-soluble polymer 10 may include hydroxypropyl cellulose (HPC). The dielectric nanoparticle 20 may include a nanoparticle having a high refractive index. The refractive index of the dielectric nanoparticle 20 may be, for example, 2 or more, 2.4 or more, or 2.7 or more. The dielectric nanoparticle 20 may include a metal oxide. The dielectric nanoparticle 20 may include, for example, $TiO_2$.

The water-soluble polymer 10 such as HPC is a non-toxic, environmentally friendly material that has a property of dissolving in water. However, the refractive index of HPC is about 1.5, and it is difficult to implement a desired color with only HPC with such a low refractive index. Therefore, in order to increase the refractive index of such a material, a nano-ink mixed with dielectric nanoparticles 20 having a high refractive index may be used to manufacture a nanostructure NS. Depending on an amount of $TiO_2$ mixed with HPC, the effective refractive index of the nano-ink may change.

$TiO_2$ may exhibit an extinction coefficient of approximately $1\times10^{-5}$ or less and a refractive index of approximately 2.4 for light in the visible light wavelength band. A nano-ink mixed with $TiO_2$ nanoparticles into HPC may exhibit a refractive index of approximately 1.9 and a low extinction coefficient close to 0.

A ratio of the dielectric nanoparticles 20 included in the water-soluble polymer 10 may be about 50 wt % to about 70 wt %. The specific numerical value of the content of the dielectric nanoparticles 20 may vary depending on the details of the water-soluble polymer 10 and the dielectric nanoparticles 20.

The ratio of the $TiO_2$ nanoparticles included in the HPC may be about 50 wt % to about 70 wt %, or about 55 wt % to about 65 wt %. The specific content may be determined so that the nano-ink exhibits an extinction coefficient of almost 0 or close to 0, for example, an extinction coefficient of $1\times10^{-5}$ or less, and a refractive index of 1.7 or more, 1.8 or more, or 1.9 or more.

Figure 3:
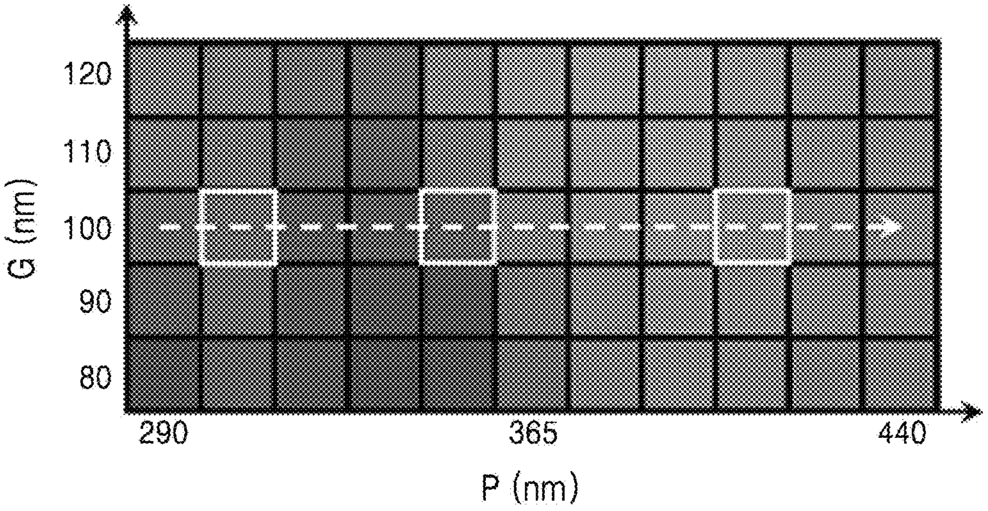
FIG. 3 is a conceptual diagram showing that various colors are implemented according to an arrangement period and spacing of nanostructures included in a meta-label according to an embodiment.

FIG. 3 is a conceptual diagram showing that various colors are implemented according to the arrangement period P and spacing G of the nanostructures NS included in the meta-label 100 according to an embodiment.

As the arrangement period P changes from 290 nm to 440 nm, the implemented color changes roughly to blue, green, and red series, and even if the arrangement period P is the same, colors with different detailed color distributions appear depending on the spacing G between the nanostructures (NS), i.e., a distance between the nanostructures NS.

Figure 4:
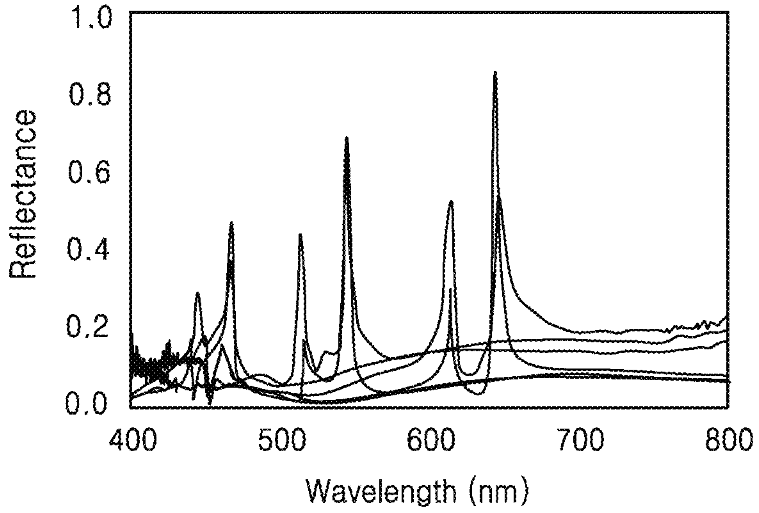
FIG. 4 is an example of a wavelength-reflectance graph that may appear due to an arrangement form of nanostructures included in a meta-label according to an embodiment.

FIG. 4 shows an example wavelength-reflectance graph that may appear according to an arrangement form of the nanostructures included in a meta-label according to the embodiment.

The graphs are results according to various design dimensions for the arrangement of nanostructures NS, and the sharper the peak of the graph, the brighter and more accurate color may be displayed. To this end, high-order Mie resonance and electric dipole resonance should be reduced. To this end, Rayleigh anomaly, which generates waves propagating within an array of nanostructures NS, is utilized. When the arrangement period nanostructure is P, and the refractive index of the object OBJ on which the nanostructures NS are arranged is n, Rayleigh anomaly occurs at a wavelength of $\lambda=P\times n$. The arrangement period may be set so that the wavelength is located at a wavelength longer than the electric dipole mode.

Using the above-described principle, a sharp reflectance peak may be obtained, that is, a vivid color may be implemented.

Figure 5:
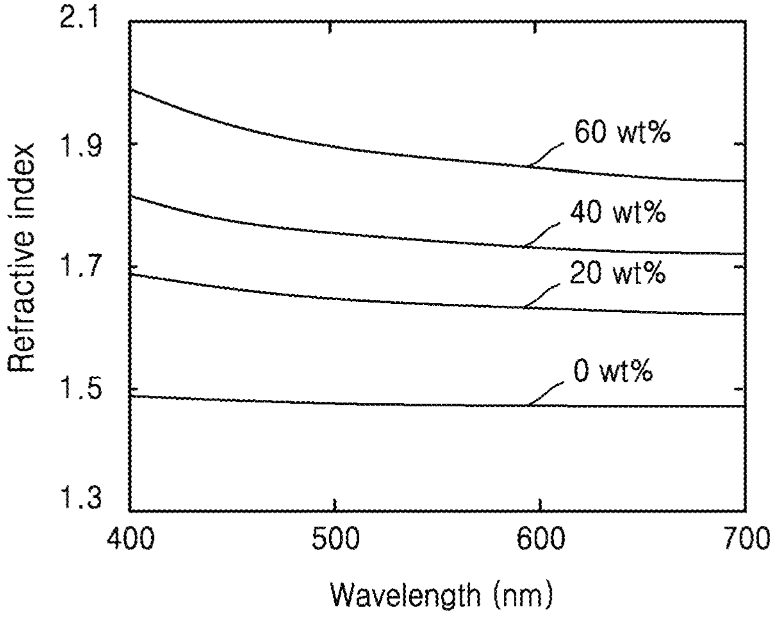
FIG. 5 is a graph showing the change in refractive index according to the content of $TiO_2$ particles included in nanostructures included in a meta-label according to an embodiment.

FIG. 5 is a graph showing the change in refractive index according to the content of $TiO_2$ nanoparticles included in nanostructures included in a meta-label according to an embodiment.

As the content of $TiO_2$ nanoparticles increases, the refractive index of the nano-ink including HPC and $TiO_2$ nanoparticles increases.

Figure 6:
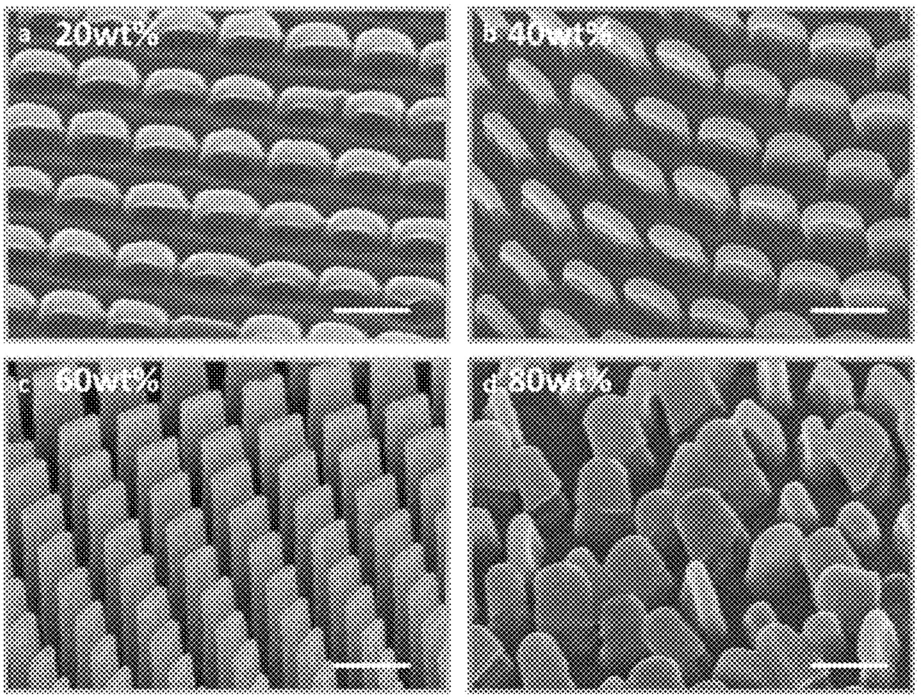
FIG. 6 shows microscope images of a meta-label according to an embodiment and shows cases when the content of $TiO_2$ nanoparticles included in nanostructures is different.

FIG. 6 shows microscopic images of meta-label s according to examples, and shows cases where the content of $TiO_2$ nanoparticles included in the nanostructures is different.

When a nanostructure is formed using nano-ink with a content of 20 wt % or 40 wt % of $TiO_2$ nanoparticles, a force supporting the shape is weak, and it is difficult to implement the nanostructure NS to a desired height.

When the content of $TiO_2$ nanoparticles is as large as 80 wt %, agglomeration of nanoparticles may occur, which may cause the nano-ink not to properly enter a soft mold, and the nanostructure may be manufactured in a broken shape or the nanostructures may be manufactured in a shape in which the nanostructures are attached to each other.

In this way, considering the refractive index according to the amount of $TiO_2$, the support power for maintaining the shape of the nanostructure, etc., the $TiO_2$ nanoparticles included in the nano-ink may be determined within a range of about 60 wt %, for example, about 50 wt % to about 70 wt % or about 55 wt % to about 65 wt %.

Figure 7:
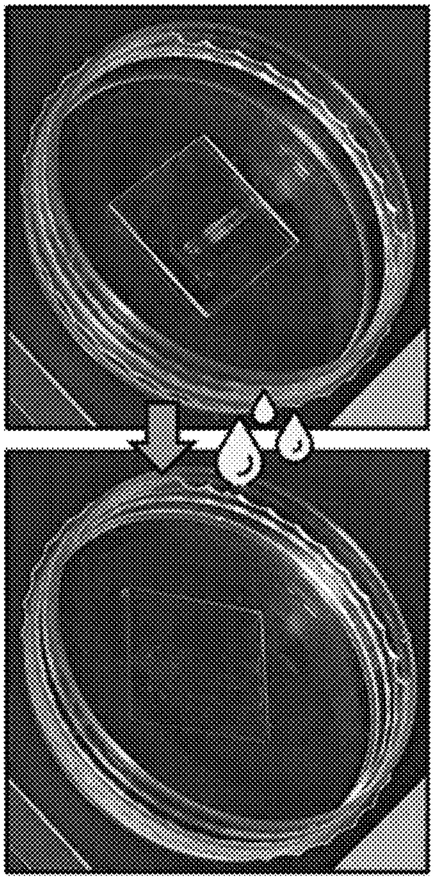
FIG. 7 is a diagram experimentally showing that a meta-label according to an embodiment is soluble in water.

FIG. 7 is a diagram experimentally showing that the meta-label according to an embodiment is soluble in water.

Through the experiment, it was confirmed that the meta-label according to an embodiment is completely soluble in water.

Figure 8A:
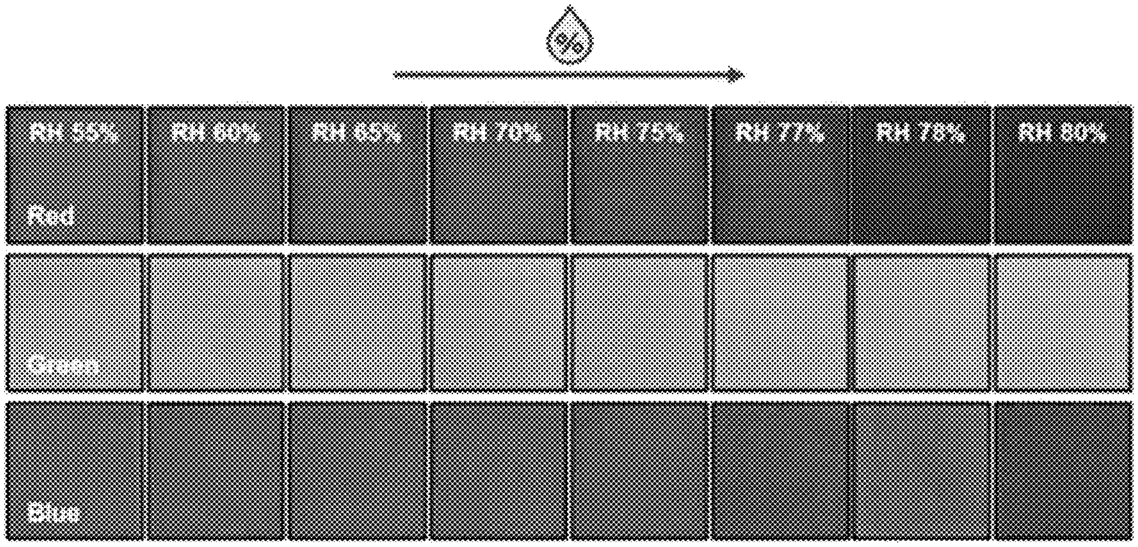
FIG. 8A is a diagram conceptually showing that the color of a meta-label according to an embodiment changes depending on the humidity environment to which the meta-label is exposed.
Figure 8B:
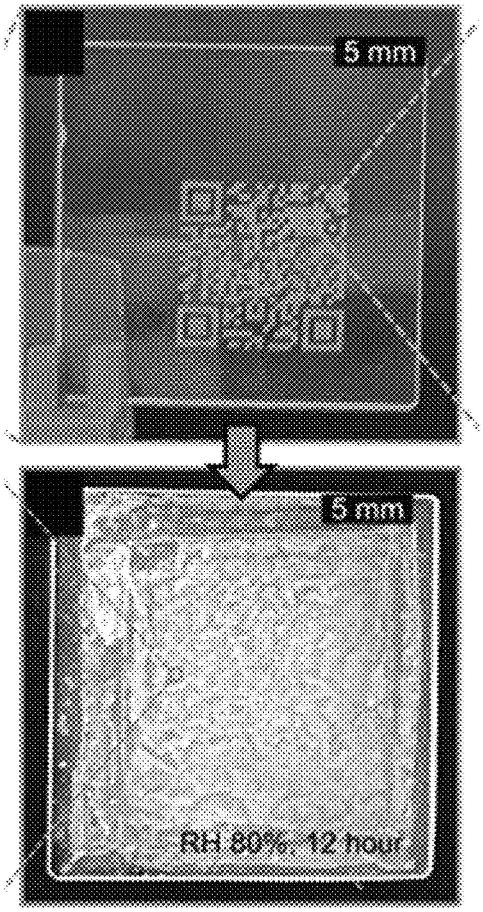
FIG. 8B is a diagram showing the change of a meta-label according to an embodiment when the meta-label is exposed to humidity for a long time.

FIG. 8A is a diagram conceptually showing that the color of a meta-label according to an embodiment is changed depending on the humidity environment to which the meta-label is exposed, and FIG. 8B is a diagram showing the change of a meta-label according to an embodiment when the meta-label is exposed to humidity for a long time.

The meta-label according to an embodiment has a property that changes color depending on the exposed humidity environment.

FIG. 8A is an optical microscope image showing the change in color of the meta-label as the relative humidity RH changes from 55% to 80%. The images show a state that the meta-label is reacted to humidity exposure for about 10 seconds, and it was confirmed that at about 75% humidity, red, green, and blue changed to dark green, orange, and brown, respectively. This change occurs when the exposure time to humidity is very short, about 10 seconds, and when the exposure to humidity stops, it returns to the original color.

FIG. 8B shows the change of the meta-label when exposed to 80% humidity for 12 hours. When the meta-label is exposed to humidity for a long period of time, the nanostructures included in the meta-label swell and stick to each other, and thus, the previously designed color or pattern is not maintained. This property may be utilized for sensing a humidity environment. From the degree of deformation of the shape of the meta-label, it may be determined that an object to which the meta-label is attached has been exposed to a humidity environment for a long period of time. In other words, the degree of deformation of the meta-label may be an indicator for judging the condition of the object, such as freshness or deterioration.

Figure 9A:
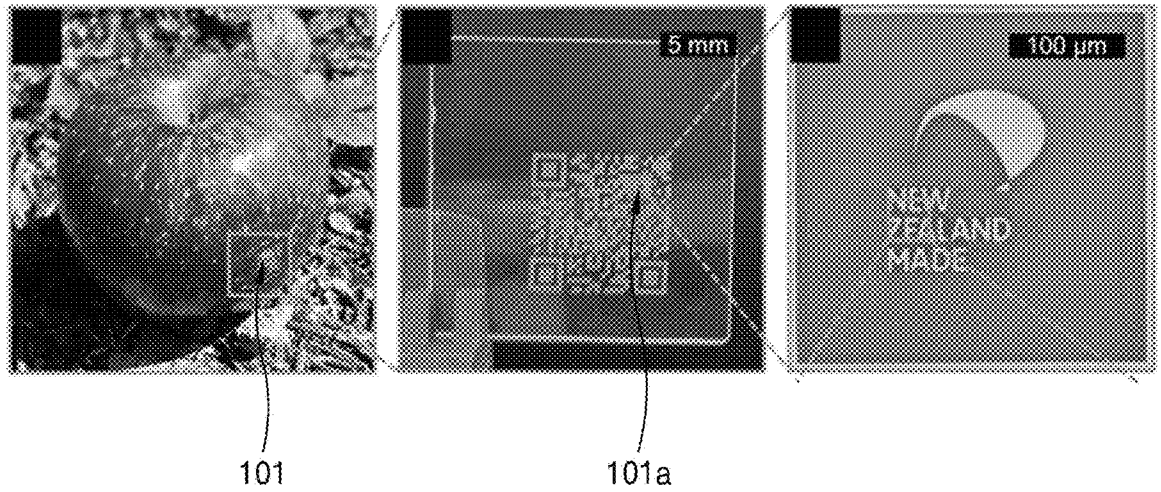
FIGS. 9A to 9C show various examples to which a meta-label according to an embodiment is applied.
Figure 9B:
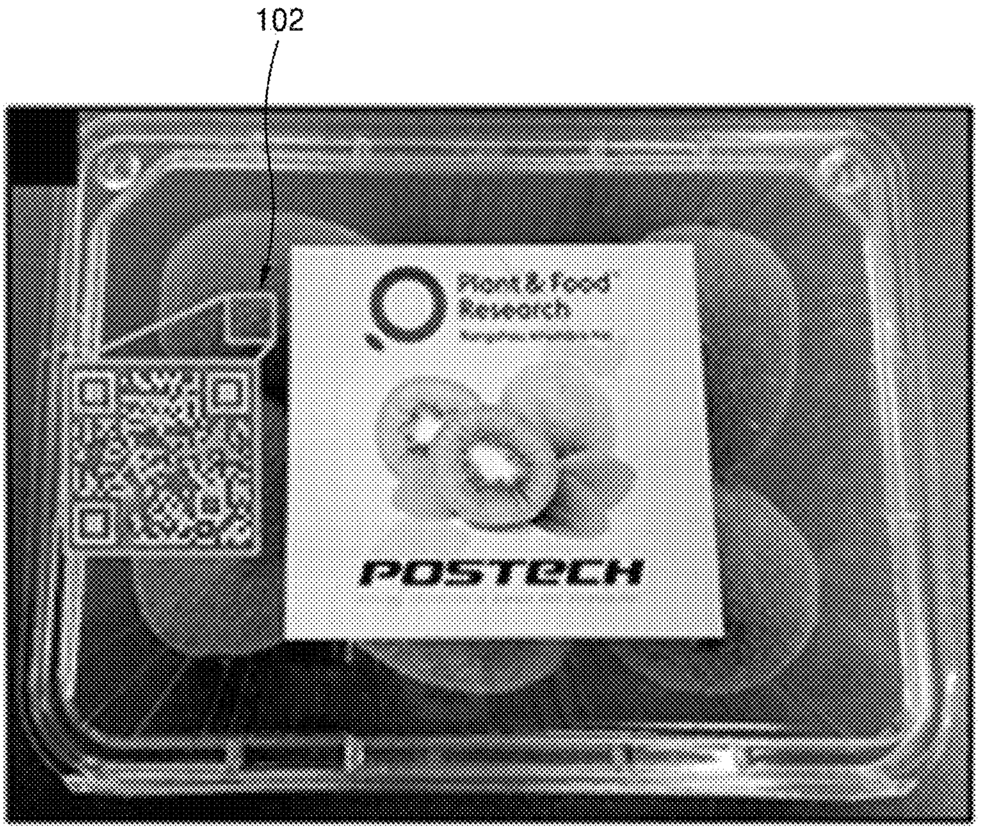
Figure 9C:
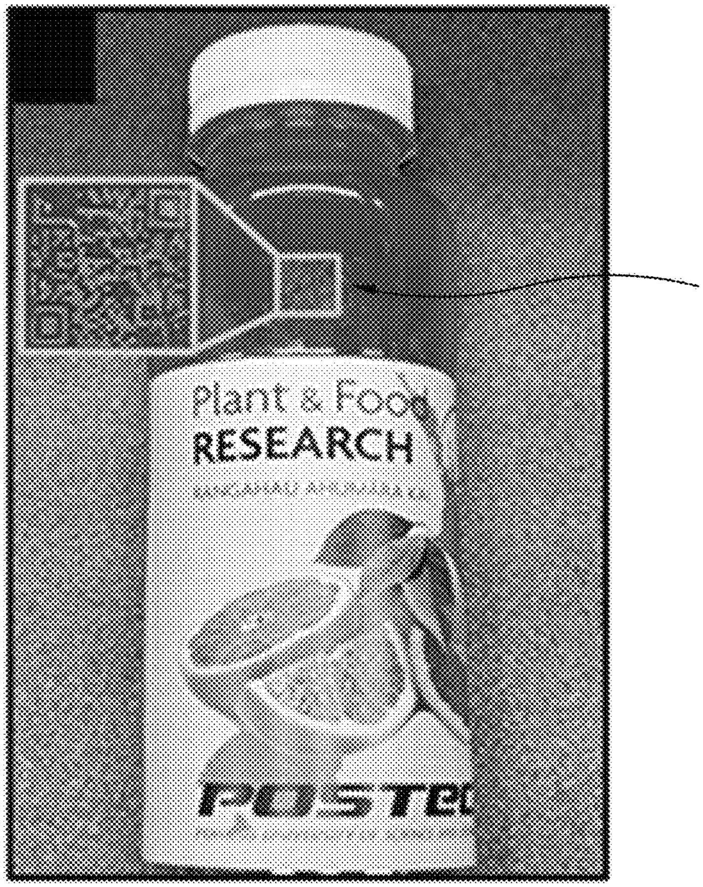

FIGS. 9A to 9C show various examples of applications of meta-label according to an embodiment.

As illustrated in FIG. 1, the meta-label may display information about an object in the form of characters, and may also have the form of a QR code, as illustrated in FIGS. 9A, 9B, and 9C.

In addition, as illustrated in FIG. 9A, a meta-label 101 may be in the form of a QR code, and a micro-sized mark 101*a* may be formed within the QR code. For example, a 10 μm-sized character may be printed on a 1 cm by 1 cm-sized QR code, and by forming the mark 101*a* in this way, forgery or alteration may be prevented.

Referring to FIG. 9B, a meta-label 102 may be formed on a fruit container.

Referring to FIG. 9C, a meta-label 103 may be formed on a beverage bottle.

FIGS. 10A to 10G are diagrams for explaining a manufacturing process of a meta-label according to an embodiment.

Figure 10A:
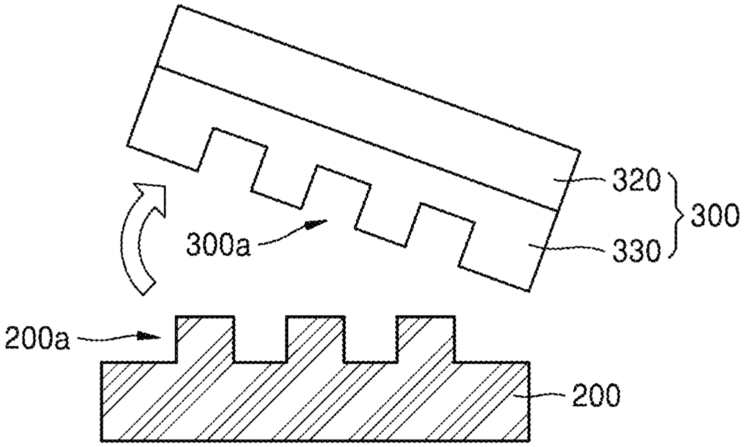
FIGS. 10A to 10G are diagrams for explaining a process of manufacturing a meta-label according to an embodiment.

Referring to FIG. 10A, a soft mold 300 is formed by replicating a master mold 200. A pattern 200*a* formed on the master mold 200 is a shape corresponding to the shape and arrangement of nanostructures forming a meta-label to be manufactured. The master mold 200 may be formed on a silicon substrate, etc., by electron beam lithography or photolithography. The master mold 200 may be reused hundreds of times, that is, hundreds of soft molds 300 may be manufactured using the master mold 200.

A mold material may be pressed onto the master mold 200 to form the soft mold 300 in which the pattern 200*a* of the master mold 200 is replicated. That is, a pattern 300*a* formed on the soft mold 300 is a reverse pattern of the pattern 200*a* formed on the master mold 200.

The soft mold 300 may include a first layer 320 and a second layer 330. The second layer 330 that directly contacts the pattern 200*a* of the master mold 200 may include a material having lower viscosity and higher mechanical strength than the first layer 320. For example, the first layer 320 may include hard polydimethylsiloxane (PDMS), and the second layer 330 may include hard polydimethylsiloxane (h-PDMS). However, this is an example, and the soft mold 300 may be formed as a single layer using a flexible material.

Figure 10B:
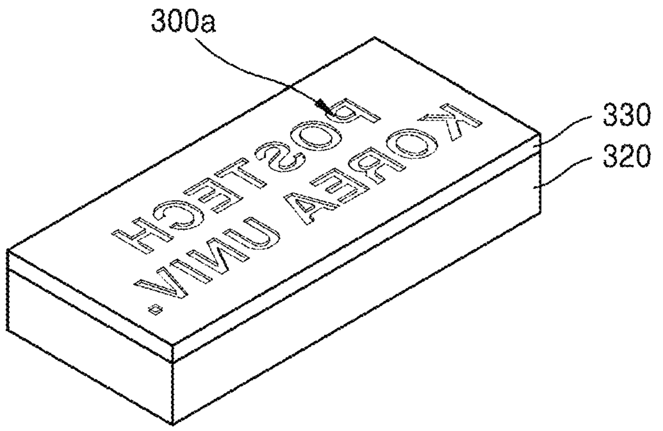

The pattern 300*a* of the soft mold 300 illustrated in FIG. 10A shows only a part of the entirety, and FIG. 10B is a perspective view showing an example overall shape of the manufactured soft mold 300.

The pattern 300*a* formed on the second layer 330 of the soft mold 300 corresponds to the reverse pattern of the character or pattern that the meta-label is intended to express.

Figure 10C:
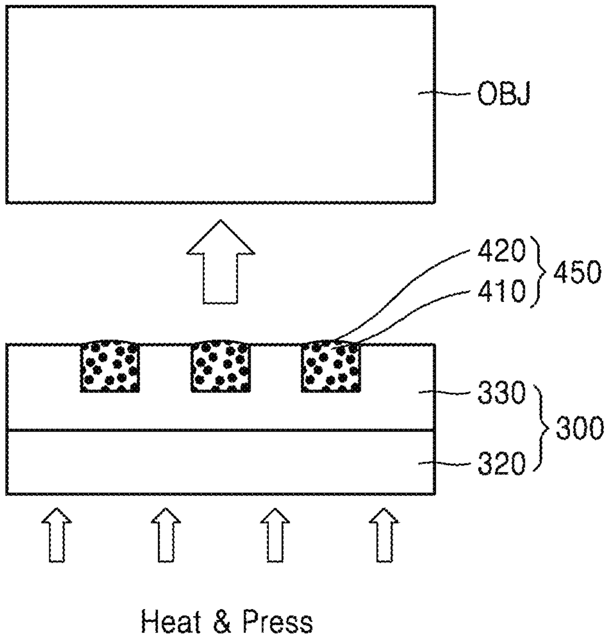

Referring to FIG. 10C, nano-ink 450 is applied onto the soft mold 300. The application of the nano-ink 450 may be performed by using a spin coating method. The nano-ink 450 includes a material in which water-soluble polymers 410 and dielectric nano particles 420 are mixed. For example, the nano-ink 450 may be manufactured by mixing an HPC solution and a $TiO_2$ nanoparticle solution. The nano-ink 450 fills an inside of an engraved region formed in the soft mold 300 in the form of an uncured liquid.

The soft mold 300 to which the nano-ink 450 is applied may be coupled to one surface of the object OBJ. The object OBJ may be a food or a food container. The one surface of the object OBJ is shown as flat, but this is an example, and it may have a shape including a curved surface. The soft mold 300 may include a flexible material, so it may be easily attached to a surface including a curved surface.

Figure 10D:
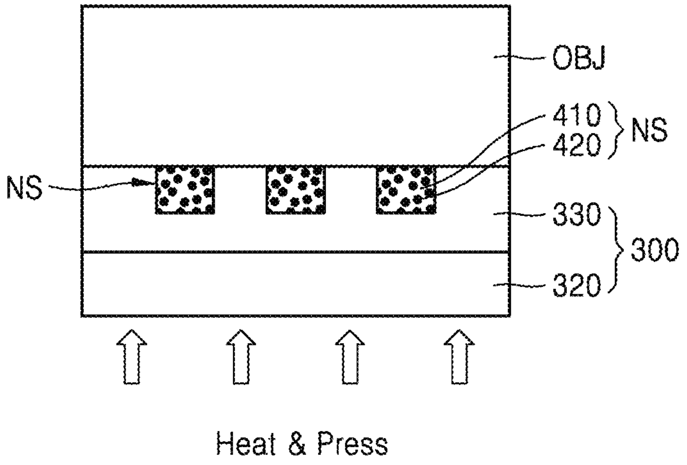

Referring to FIG. 10D, after a soft mold 300 on which the nano-ink 450 is applied is placed on the object OBJ, heat and pressure may be applied. For example, ultraviolet rays may be irradiated onto the soft mold 300. During this process, the nano-ink 450 is cured, and nanostructures NS composed of a plurality of water-soluble polymers 410 and dielectric nanoparticles 420 are formed on one surface of the object OBJ.

Figure 10E:
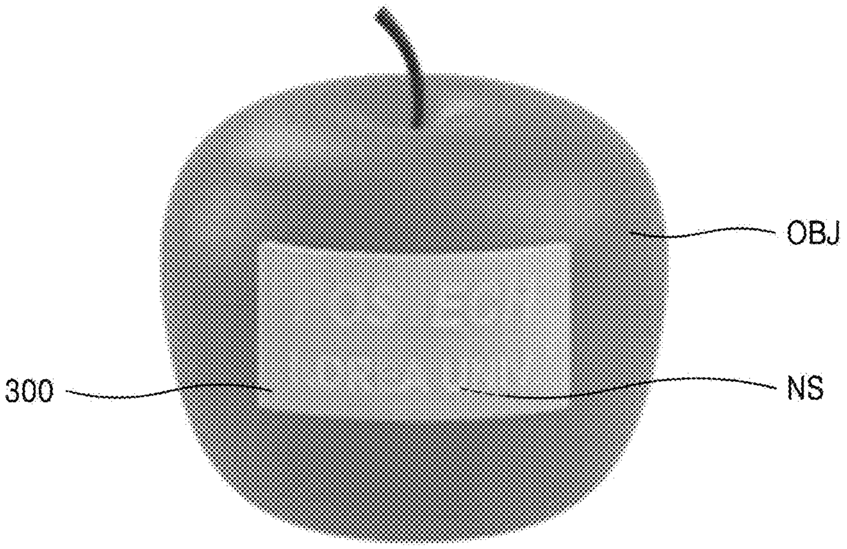

FIG. 10E shows an example that the soft mold 300 is attached to a surface of the object OBJ, and the nano-ink 450 applied to the soft mold 300 is cured to form nanostructures NS.

Figure 10F:
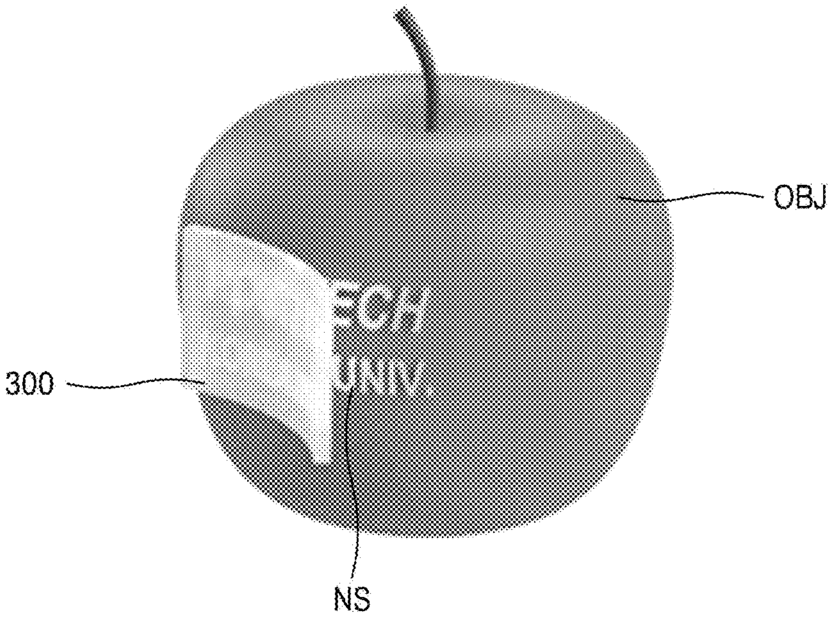

Referring to FIG. 10F, the soft mold 300 may be separated from the object OBJ.

Figure 10G:
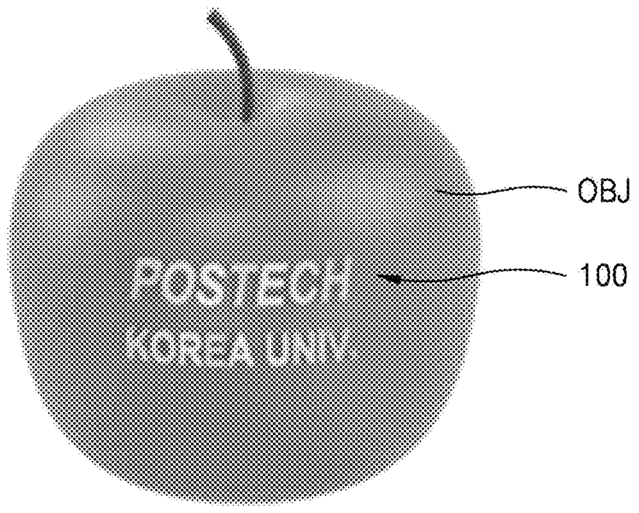

Referring to FIG. 10G, the meta-label 100 formed on the surface of the object OBJ is provided.

The manufacturing method according to an embodiment includes a process of manufacturing the master mold 200 using electron beam lithography, and then replicating the pattern formed in the master mold 200 onto the soft mold 300. At this time, the soft mold 300 may be used repeatedly multiple times, and when the soft mold 300 becomes difficult to reuse, the soft mold 300 may be manufactured again using the master mold 200.

The manufacturing method described above may be used repeatedly and utilizes a large-area soft mold 300, so it is advantageous for mass production of meta-label.

The meta-label described above may be formed on food or food containers, and in addition, it may also be formed on containers of various shapes and materials including flat or curved surfaces, such as glass, silicon substrates, plastic substrates, plastic packaging, and flexible PET substrates.

The meta-label described above may display information about an object on which the meta-label is formed in vivid color.

The meta-label described above is formed based on a nanostructure, and may express desired information in a very small and thin form.

The meta-label described above includes a material that dissolves in water, and is therefore environmentally friendly.

Unlike a sticker-type label, the meta-label described above may not be simply removed and attached from an object on which the meta-label is formed, and therefore it is difficult to forge or alter the information included in the meta-label.

The meta-label described above may function as a smart label that provides information about the degree of exposure to humidity of an object on which the meta-label is formed.

According to the method described above for manufacturing a meta-label, a meta-label that has high color clarity, is environmentally friendly, is difficult to forge/alter, and may function as a smart label may be provided.

While the meta-label and a method for manufacturing the meta-label have been described with reference to the embodiments shown in the drawings, it will be understood by those of ordinary skill in the art that various changes in form and details may be made therein without departing from the spirit and scope of the inventive concept. Therefore, the embodiments should be considered in descriptive sense only and not for purposes of limitation. The scope of the disclosure is defined not by the detailed description of the disclosure but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A meta-label comprising:

an object; and a plurality of nanostructures formed on one surface of the object and including a material including a water-soluble polymer and dielectric nanoparticles;

wherein the plurality of nanostructures are arranged to display characters, wherein the characters include information about the object, wherein a ratio of the dielectric nanoparticles included in the water-soluble polymer is determined such that an extinction coefficient of the plurality of nanostructures is $1\times10^{-5}$ or less and a refractive index of the plurality of nanostructures is greater than 1.8, wherein the object is food or a container capable of holding food, wherein the plurality of nanostructures are regularly arranged with a predetermined arrangement period, and wherein the predetermined arrangement period is P, and a refractive index of the object is n, $P\times n$ is about 400 nm to about 700 nm.

2. The meta-label of claim 1, wherein the water-soluble polymer is hydroxypropyl cellulose.

3. The meta-label of claim 1, wherein the dielectric nanoparticles include a metal oxide.

4. The meta-label of claim 1, wherein the dielectric nanoparticles include $TiO_2$ nanoparticles.

5. The meta-label of claim 1, wherein the plurality of nanostructures include hydroxypropyl cellulose and $TiO_2$ nanoparticles mixed therewith.

6. The meta-label of claim 5, wherein a ratio of $TiO_2$ nanoparticles included in the hydroxypropyl cellulose is about 50 wt % to about 70 wt %.

7. The meta-label of claim 1, wherein the predetermined arrangement period is determined such that a Rayleigh anomaly is formed within a visible light wavelength band.

8. A method of manufacturing a meta-label, the method comprising:

manufacturing a master mold having a pattern identical to a plurality of nanostructures to be formed on a target object;

manufacturing a soft mold by replicating the master mold;

applying nano-ink including a water-soluble polymer and dielectric nanoparticles onto the soft mold, and attaching the soft mold to which the nano-ink is applied to the target object; and separating the soft mold from the target object to form the plurality of nanostructures, wherein a ratio of the dielectric nanoparticles included in the water-soluble polymer is determined such that an extinction coefficient of the plurality of nanostructures is $1\times10^{-5}$ or less and a refractive index of the plurality of nanostructures is greater than 1.8, wherein the target object is food or a container capable of holding food, wherein the plurality of nanostructures are regularly arranged with a predetermined arrangement period, and wherein the predetermined arrangement period is P, and a refractive index of the target object is n, $P\times n$ is about 400 nm to about 700 nm.

9. The method of claim 8, wherein the water-soluble polymer includes hydroxypropyl cellulose.

10. The method of claim 9, wherein a ratio of $TiO_2$ nanoparticles included in the hydroxypropyl cellulose is about 50 wt % to about 70 wt %.

11. The method of claim 8, wherein the dielectric nanoparticles include a metal oxide.

12. The method of claim 8, wherein the dielectric nanoparticles include $TiO_2$ nanoparticles.

13. The method of claim 8, wherein the nano-ink includes hydroxypropyl cellulose and $TiO_2$ nanoparticles mixed therewith.

* * * * *